United States Patent [19]
Lee

[11] Patent Number: 5,862,705
[45] Date of Patent: Jan. 26, 1999

[54] SPEED TRANSFERRING SYSTEM FOR A LATHE

[76] Inventor: Chi-Nan Lee, No. 11-2, Hsin Kai Lane, Hsi Nan Rd., Wu Jih Hsiang, Taichung, Taiwan

[21] Appl. No.: 910,368

[22] Filed: Aug. 13, 1997

[51] Int. Cl.⁶ .................................................. F16H 3/32
[52] U.S. Cl. ........................................ 74/337.5; 74/344
[58] Field of Search ............................ 74/337.5, 341, 74/344

[56] References Cited

U.S. PATENT DOCUMENTS

| | | | |
|---|---|---|---|
| 1,013,977 | 1/1912 | Wheelock | 74/344 |
| 1,059,434 | 4/1913 | Butler | 74/344 |
| 1,246,568 | 11/1917 | Eberhardt | 74/344 |
| 1,490,591 | 4/1924 | Congellier | 74/337.5 |
| 4,664,217 | 5/1987 | Welch et al. | 74/337.5 |

*Primary Examiner*—Dirk Wright
*Attorney, Agent, or Firm*—Heller Ehrman White & McAuliffe

[57] ABSTRACT

A speed transferring system includes an input shaft having a first input gear and a second input gear, a middle shaft having a slidable engaging member which includes a first middle gear, a second middle gear and a third middle gear. The first, second and third middle gears are connected with each other. An output shaft has a first output gear and a second output gear. A shaft driven by a motor has a shifting device which retains the first middle gear so as to alternately engage the engaging member with the first input gear, the second input gear, the first output gear and the second output gear.

8 Claims, 8 Drawing Sheets

SPEED TRANSFERRING SYSTEM FOR A LATHE

BACKGROUND OF THE INVENTION

1. Field of the Invention

The present invention relates to speed transferring system and, more particularly, to an improved speed transferring system for a lathe with stopping a driving engine of the lathe.

2. Brief Description of the Prior Art

Lathes include two main types, one of which includes a conventional driving motor driving a shaft which has a chuck disposed to the shaft, and the other of which includes a servo motor to drive the shaft. When changing speed levels of the lathe, the driving motor of the former type has to be stop so as to completely stop the shaft and then ped control rods are shifted to change gears arrangements in a gear box connected to the driving motor such that when restarting the driving motor, the shaft will rotate at a desired speed. The servo motor of the latter type does not need to be stopped when changing the speed levels. However, an output of the servo motor is transmitted by belts so that it cannot produce a large torque. In addition, the servo motor is very expensive. Therefore, changing the speed levels of the former type of the lathe takes a lot of time and the latter type of the lathe costs too much and produces only a small torque.

The present invention intends to provide an improved speed transferring system for a lathe to mitigate and/or obviate the above-mentioned problems.

SUMMARY OF THE INVENTION

The present invention provides a speed transferring system which includes an input shaft with a first and a second input gear mounted thereto, a middle shaft with an engaging member slidably mounted thereto, an output shaft having a first and a second output gear respectively mounted thereto, a first shaft driven by a motor and having a shifting means disposed thereto, the shifting means having a fork member movably retaining the engaging member therewith so as to respectively engage with the first input gear, the second input gear, the first output gear and the second output gear.

It is an object of the present invention to provide a speed transferring system for a lathe such that the speed levels can be changed without the need to stop the lathe.

It is another object of the present invention to provide a speed transferring system for a lathe with a lower cost.

Other objects, advantages, and novel features of the invention will become more apparent from the following detailed description when taken in conjunction with the accompanying drawings.

DETAILED DESCRIPTION OF THE PREFERRED EMBODIMENTS

Referring to the drawings and initially to FIGS. 1 through 4, a speed transferring system in accordance with the present invention used in a lathe (not shown) generally includes an input shaft 10 having a first input gear 11 and a second input gear 12 respectively mounted thereto. The input shaft 10 has a belt pulley 15 disposed thereto so that a main motor (not shown) is indirectly drive the input shaft 10. A middle shaft 20 has an engaging member slidably mounted thereto, the engaging member including a first middle gear 21, a second middle gear 22 and a third middle gear 23, wherein the first, the second and the third middle gear 21, 22 and 23 are integrally formed as a one-piece member. An output shaft 30 has a first output gear 31 and a second output gear 32 respectively mounted thereto and a chuck member (not shown) mounted to one of two ends thereof.

Figure 5:
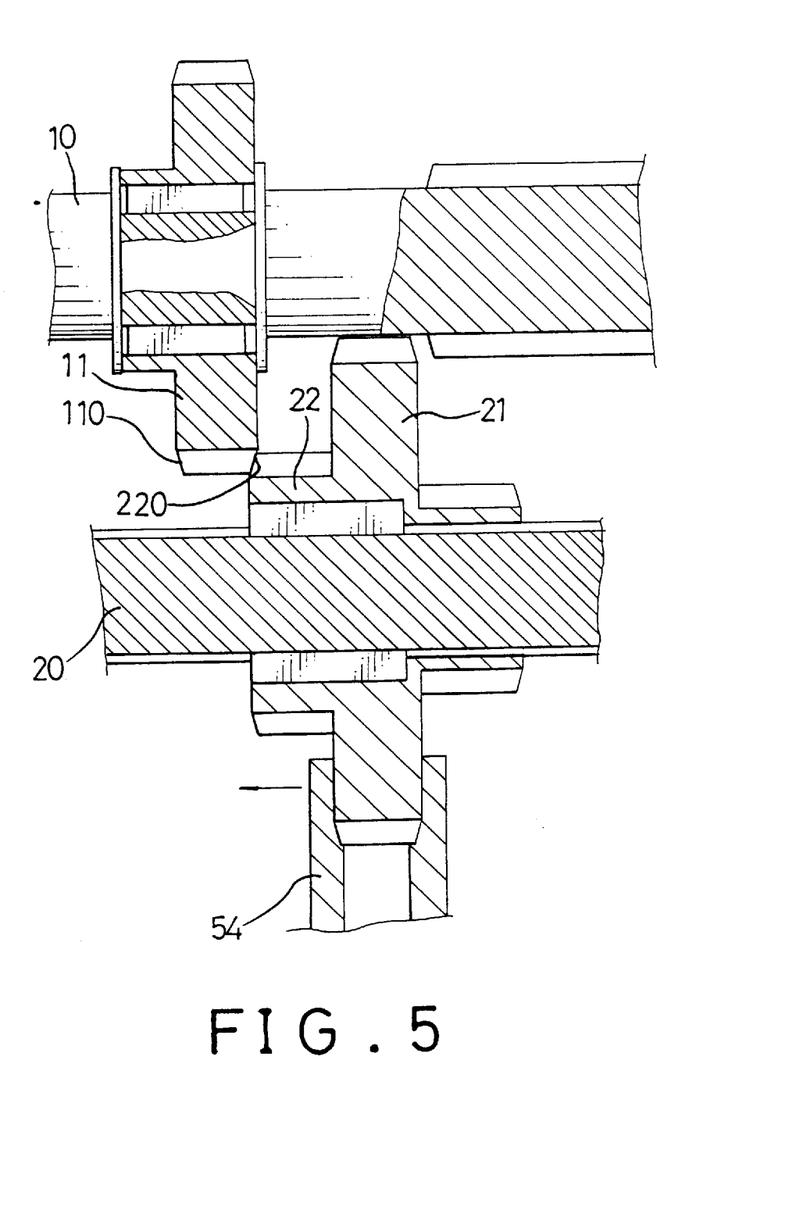
FIG. 5 is an illustrative view to show each one of the teeth of gears of the invention has inclined surfaces defined in two opposite ends thereof.

A first shaft 50 has a worm wheel 51 mounted thereto which is engaged with a worm 41 driven by a motor 40 which can be a servo motor. The first shaft 50 has a cam means 52 disposed thereto which is a tubular member having a helical groove 53 defined in an outer periphery thereof, and a shifting means 54 having a stud 55 inserted into the helical groove 53 so that the shifting means 54 is slidably mounted to the cam means 52. The shifting means 54 has a tubular member 56 disposed thereto through which a second shaft 57 freely extends. Therefore, when the cam means 52 rotates, the shifting means 54 is slidable on the second shaft 57. The shifting means 54 has a fork member 540 disposed thereto which retains the first middle gear 21 of the engaging member therewith so as to respectively engage with the first input gear 11, the second input gear 12, the first output gear 31 and the second output gear 32. Referring to FIG. 5, each tooth of the first input gear 11, the second input gear 12, the engaging member, the first output gear 31 and the second output gear 32 of the invention has two inclined surfaces 110/220 (taken the first input gear 11 and the second middle gear 22 as examples) defined in two opposite ends thereof so that an interference between any two gears will be obviated when engaging with each other.

Still referring to FIGS. 1–4, the first shaft 50 has a sensing means disposed thereto which includes a revolution counter 58 and a signal emitting member 580 so as to count revolutions of the first shaft 50. Once pre-determined revolutions are completed, the sensing means will send a stop signal to the motor 40, and the cam means 52 is rotated to move the fork member 54 together with the first middle gear 21 to a desired position.

Figure 1:
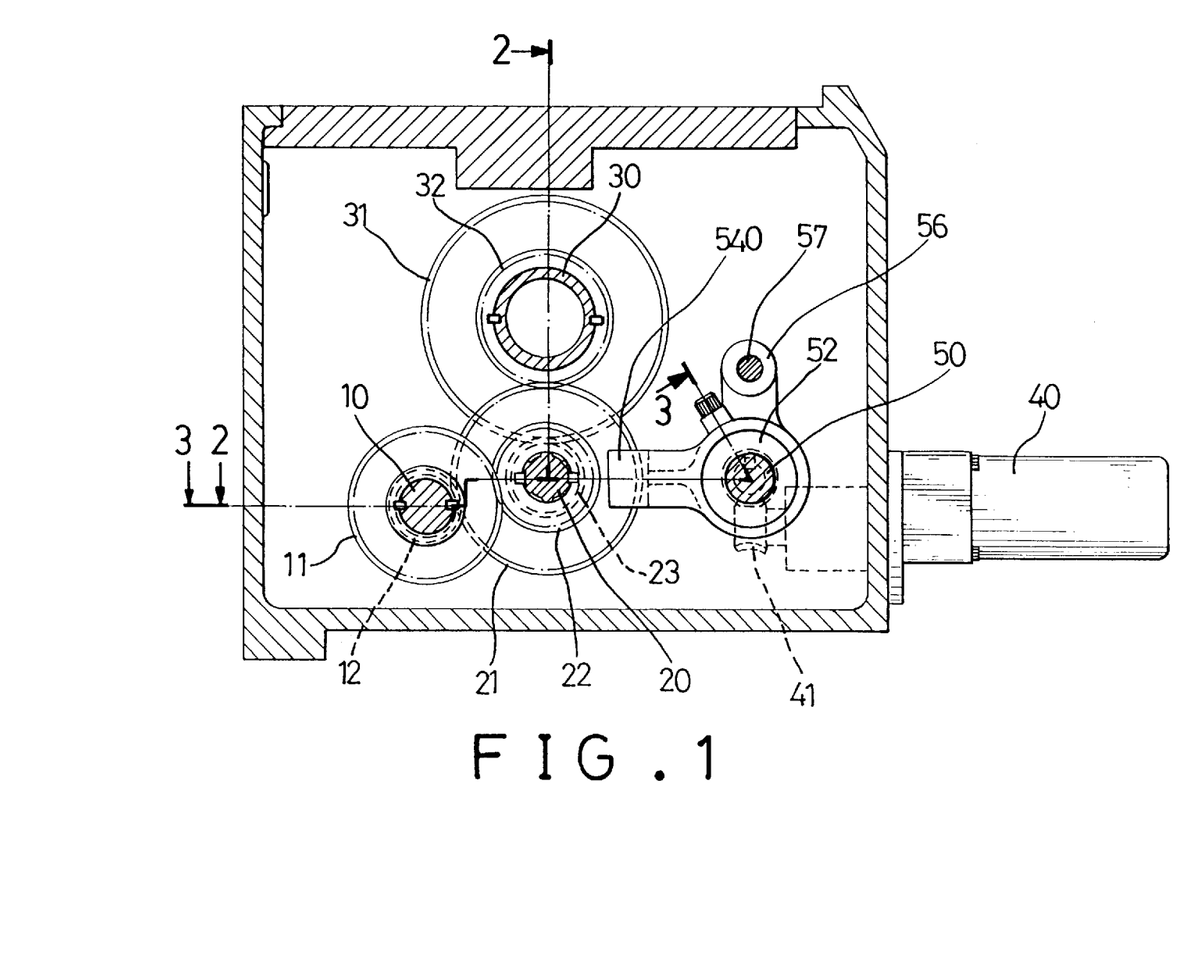
FIG. 1 is an end plan view, partly in section, of a speed transferring system in accordance with the present invention.
Figure 2:
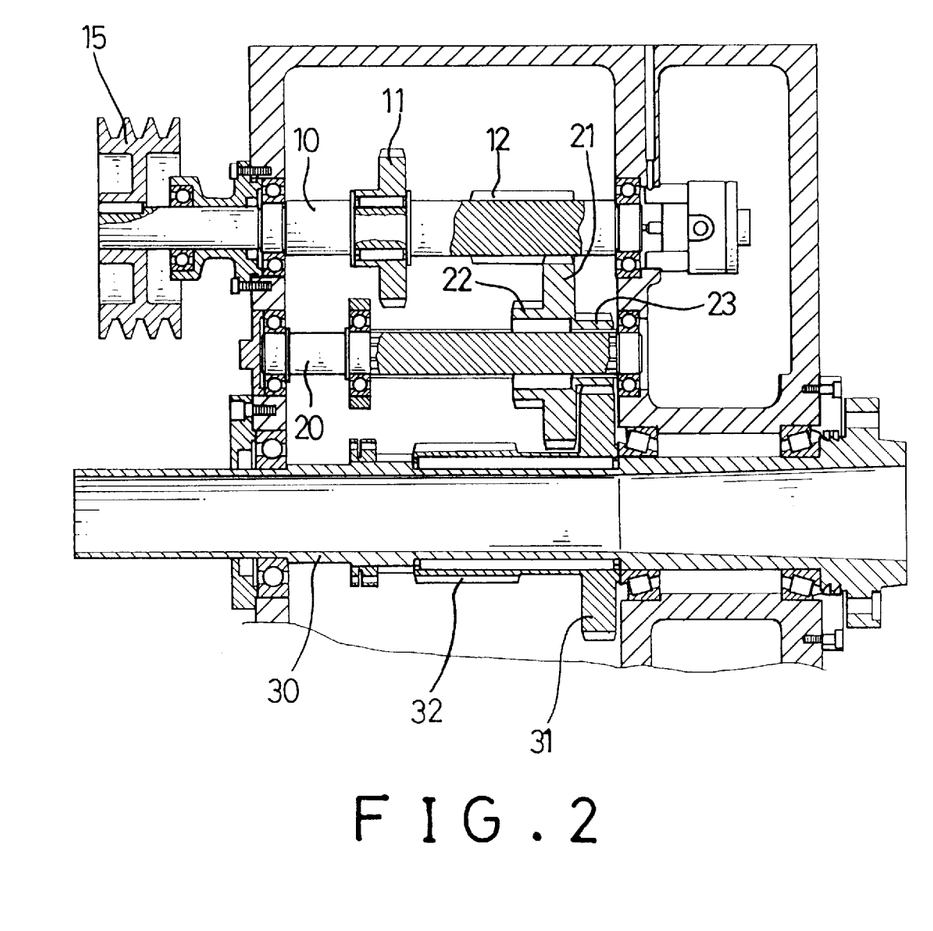
FIG. 2 is a side elevational view taken along line 2—2 in FIG. 1 of the system of the present invention, wherein an engaging member on a middle shaft is located at a first position.
Figure 3:
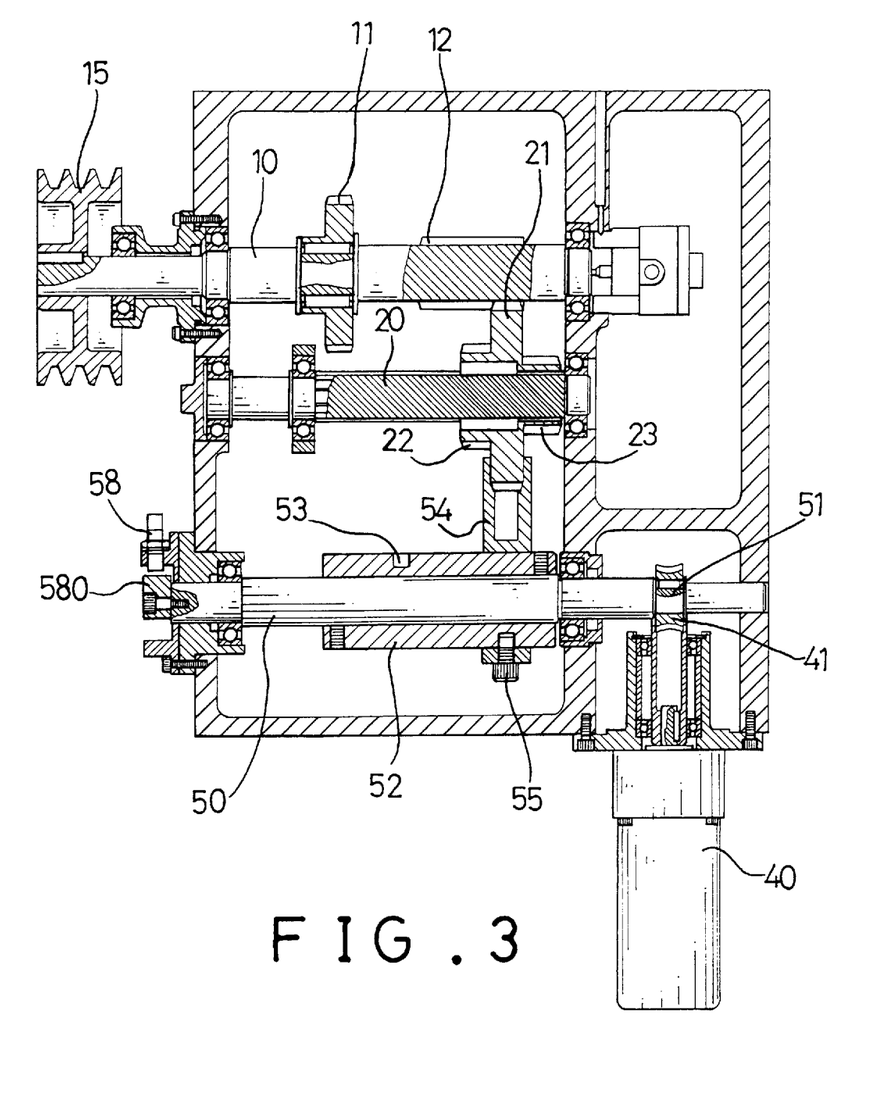
FIG. 3 is a side elevational view taken along line 3—3 in FIG. 1 of the system of the present invention to show a shifting means thereof.
Figure 4:
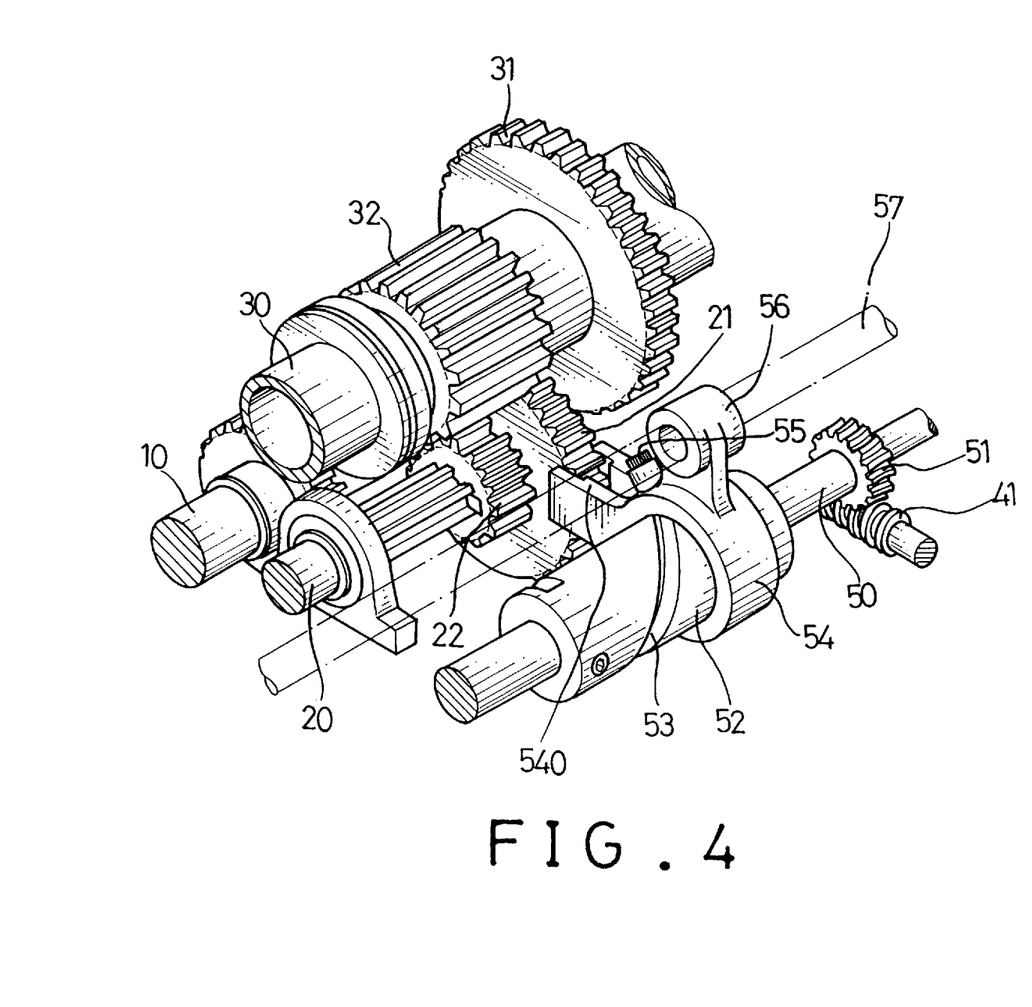
FIG. 4 is a perspective view of a part of the system in accordance with the present invention.
Figure 6:
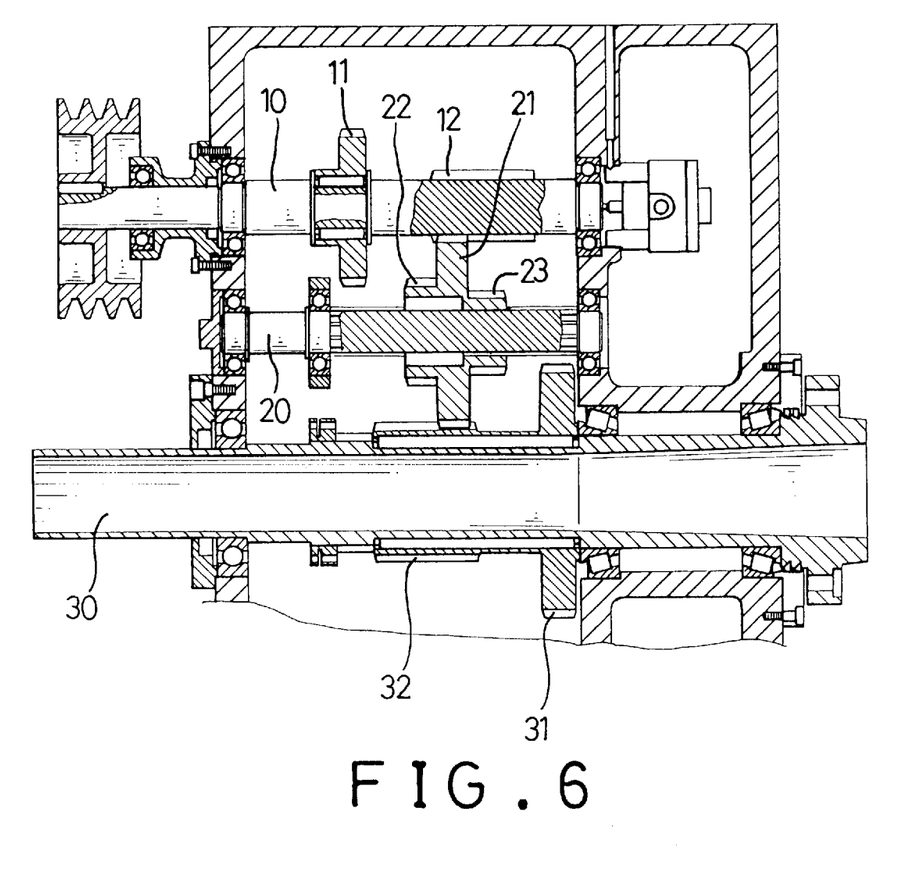
FIG. 6 is a side elevational view, partly in section, of the system wherein the engaging member on the middle shaft is shifted to a second position.
Figure 7:
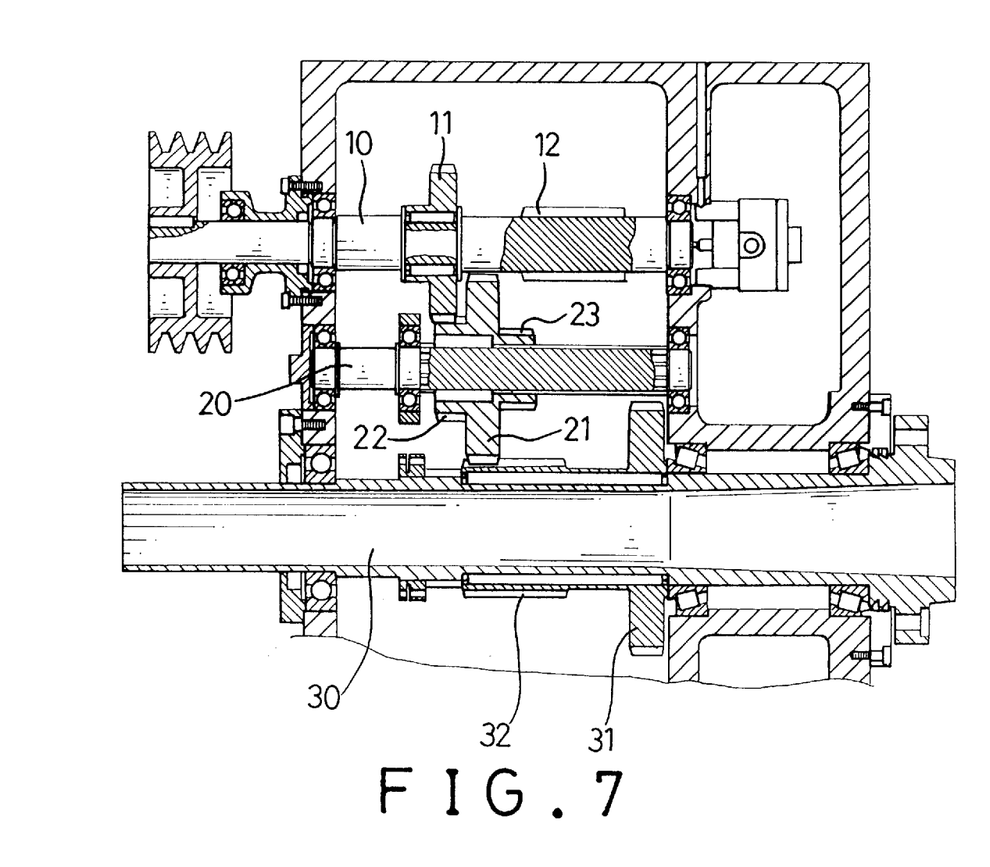
FIG. 7 is a side elevational view, partly in section, of the system wherein the engaging member on the middle shaft is shifted to a third position.

In FIG. 2, the engaging member is in a first position where the first middle gear 21 is engaged with the second input gear 12, and the third middle gear 23 is engaged with the first output gear 31. At the first position, the output shaft 30 is rotated at a lower r.p.m. Referring to FIG. 6, when changing the output shaft 30 to a middle speed level, the first middle gear 21 is moved by a rotation of the cam means 52 to let the third middle gear 23 be disengaged from the first output gear 31 and the first middle gear 21 be engaged with the second output gear 32. Referring to FIG. 7, when the output shaft 30 is desired to be rotated at a high speed, the engaging member is further shifted by the rotation of the cam means 52 to let the first middle gear 21 be disengaged from the second input gear 12 and the second middle gear 22 be engaged with the first input gear 11.

Accordingly, the speed levels of the lathe can be adjusted without stopping the main motor. An operator (not shown) only needs to press a button on a control panel (both not shown) to actuate the motor 40 to complete the operation.

Figure 8:
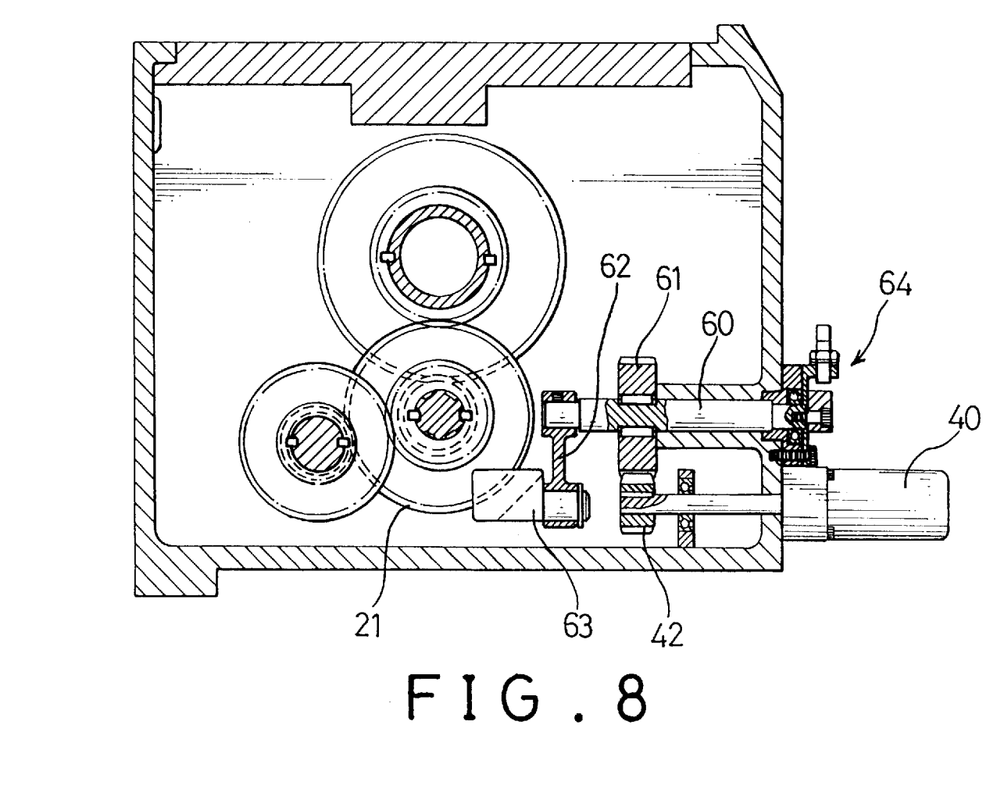
FIG. 8 is an end plan view, partly in section, of another embodiment of the shifting means of speed transferring system in accordance with the present invention.

FIG. 8 shows another embodiment of the shifting means, wherein the shifting means includes a third shaft 60 which has a first gear 61 disposed thereto and an extending plate 62 extends from a distal end of the third shaft 60. A fork member 63 is pivotally connected to the extending plate 62. The motor 40 drives a second gear 42 which is engaged with the first gear 61 so that when the motor 40 is actuated, the third shaft 40 and the fork member 63 will rotated to shift the first middle gear 21. The third shaft 60 has a sensing means 64 similar to that shown in FIG. 3 so as to sense revolutions of the third shaft 60.

Although the invention has been explained in relation to its preferred embodiment, it is to be understood that many other possible modifications and variations can be made without departing from the spirit and scope of the invention as hereinafter claimed.

What is claimed is:

1. A speed transferring system comprising:
   an input shaft having a first input gear and a second input gear respectively mounted thereto;
   a middle shaft having an engaging member slidably mounted thereto;
   an output shaft having a first output gear and a second output gear respectively mounted thereto;
   a first shaft driven by a motor and having a shifting means disposed thereto, said shifting means having a fork member movably retaining said engaging member therewith so as to respectively engage with said first input gear, said second input gear, said first output gear and said second output gear.

2. The speed transferring system as claimed in claim 1 said first shaft has a cam means disposed thereto and said shifting means is driven by said cam means.

3. The speed transferring system as claimed in claim 2 wherein said cam means is a tubular member having a helical groove defined in an outer periphery thereof, said shifting means slidably mounted to a second shaft and having a stud inserted into said helical groove.

4. The speed transferring system as claimed in claim 1 wherein said engaging member includes a first middle gear, a second middle gear and a third middle gear, said first, and said second and said third middle gear are connected with each other.

5. The speed transferring system as claimed in claim 1 wherein said first shaft has a sensing means disposed thereto so as to sense revolutions of said first shaft.

6. The speed transferring system as claimed in claim 1 wherein said motor is a servo motor.

7. The speed transferring system as claimed in claim 1 wherein said shifting means includes a third shaft which has a first gear and said fork member respectively mounted thereto, said motor driving a second gear which is engaged with said first gear.

8. The speed transferring system as claimed in claim 7 wherein said third shaft has a sensing means disposed so as to sense revolutions of said third shaft.

* * * * *